Dec. 4, 1951  T. O. SNIDER  2,577,374
AXLE CONTACT MEANS FOR VEHICLE HOISTS
Filed Dec. 7, 1948  5 Sheets-Sheet 1

INVENTOR.
THEODORE O. SNIDER
BY
Woodling and Krost
attys

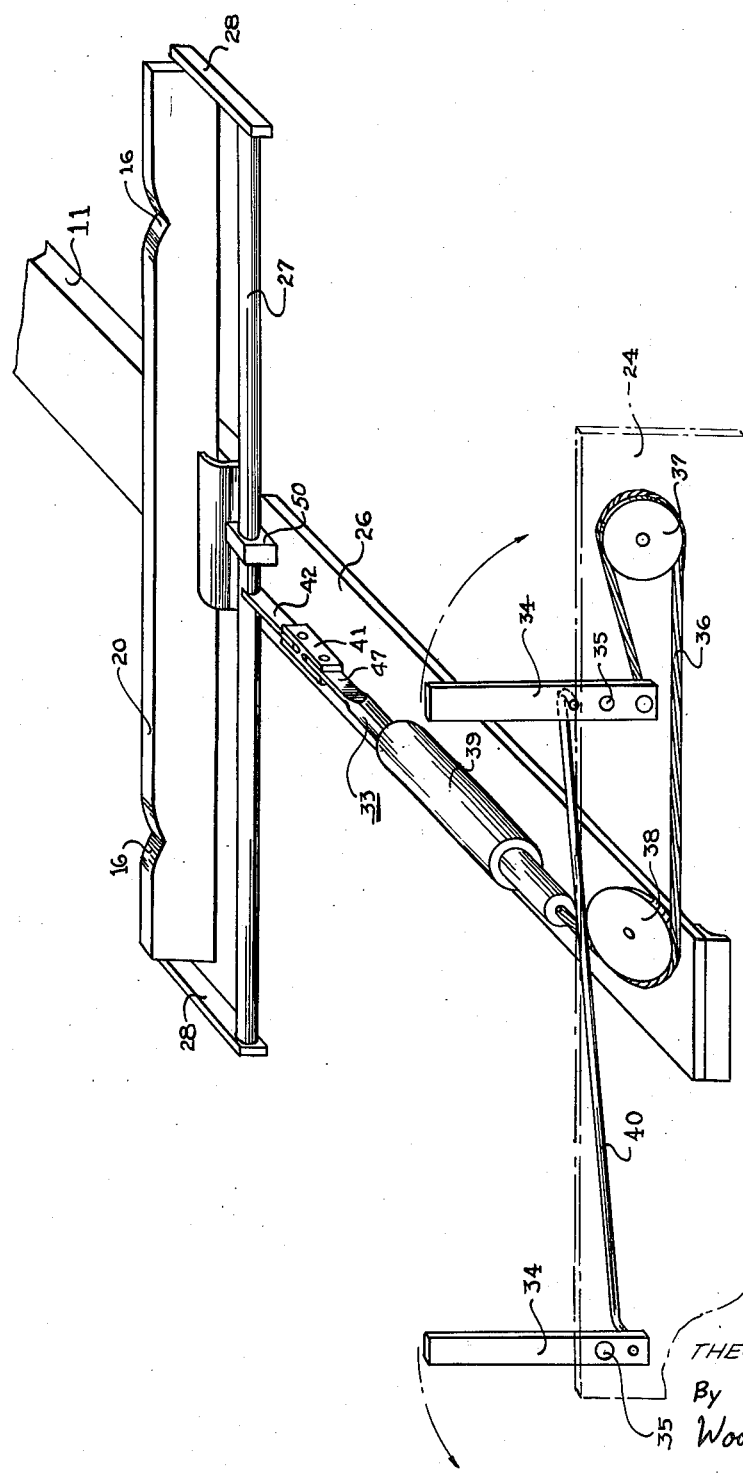

Dec. 4, 1951 T. O. SNIDER 2,577,374
AXLE CONTACT MEANS FOR VEHICLE HOISTS
Filed Dec. 7, 1948 5 Sheets-Sheet 3
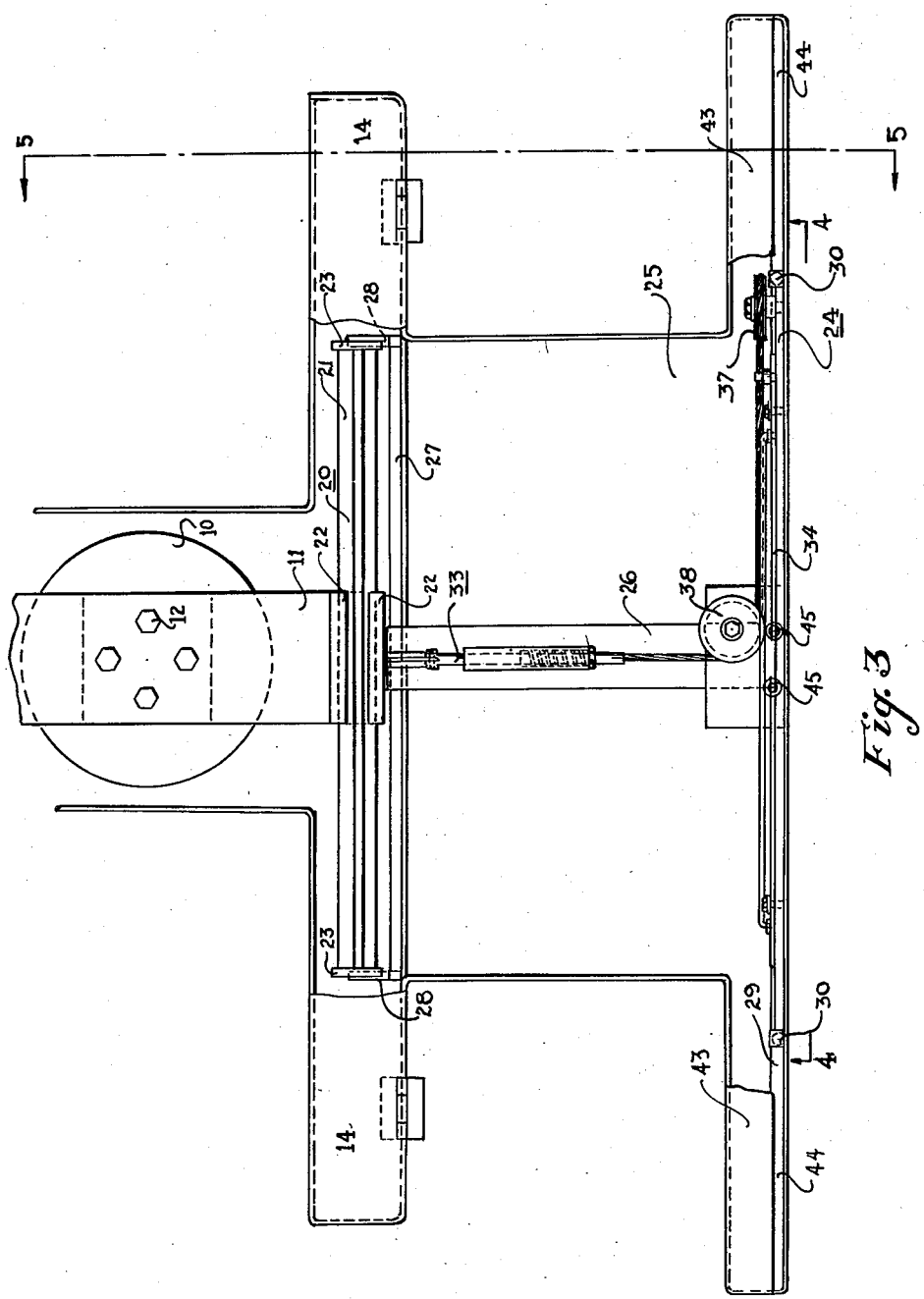
INVENTOR.
THEODORE O. SNIDER
BY
Woodling and Krost
attys Dec. 4, 1951 T. O. SNIDER 2,577,374
AXLE CONTACT MEANS FOR VEHICLE HOISTS
Filed Dec. 7, 1948 5 Sheets-Sheet 4
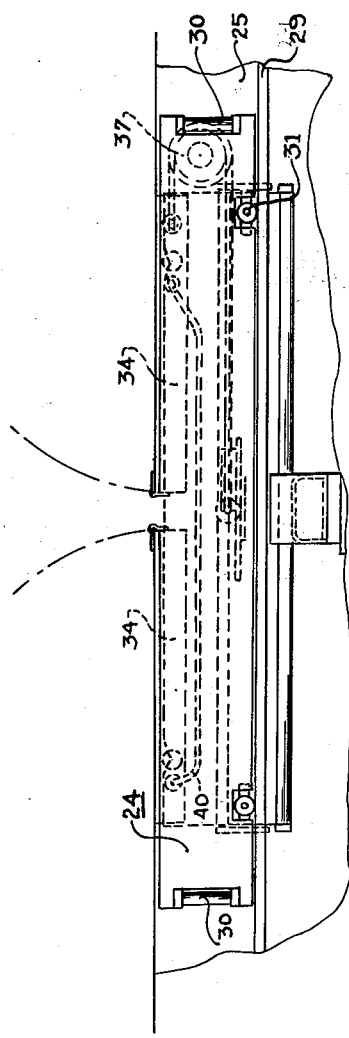
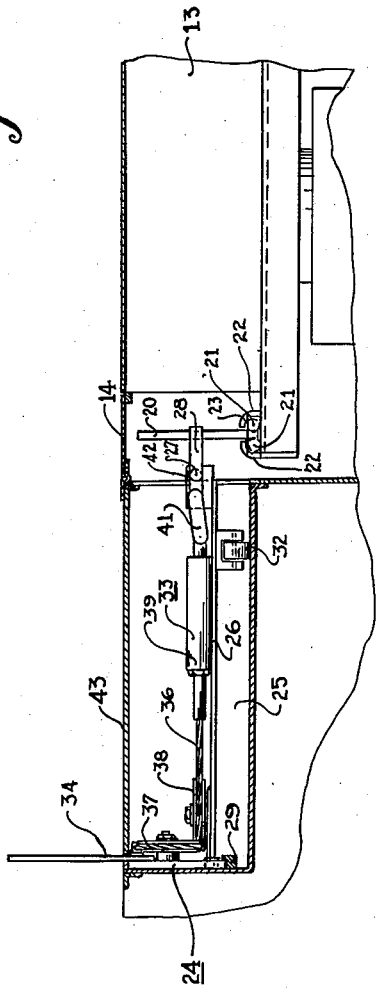
INVENTOR.
THEODORE O. SNIDER
BY
Woodling and Kroet
attys Dec. 4, 1951            T. O. SNIDER            2,577,374
AXLE CONTACT MEANS FOR VEHICLE HOISTS
Filed Dec. 7, 1948            5 Sheets-Sheet 5
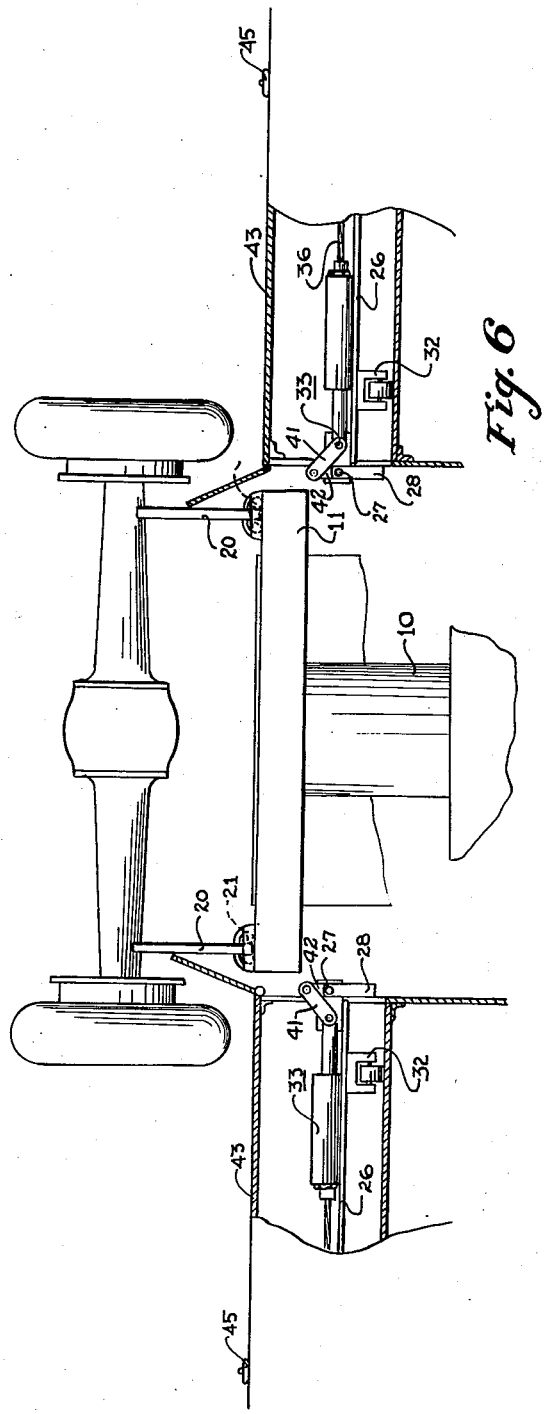
INVENTOR.
THEODORE O. SNIDER
BY
Woodling and Kroet
attys Patented Dec. 4, 1951

2,577,374

UNITED STATES PATENT OFFICE 2,577,374

AXLE CONTACT MEANS FOR VEHICLE HOISTS

Theodore O. Snider, Cleveland, Ohio, assignor, by mesne assignments, to Harold C. Schott, Cleveland, Ohio Application December 7, 1948, Serial No. 64,017

5 Claims. (Cl. 254—89)

This invention relates to automobile lifts in general, and relates more particularly to a lift which is retractable into a covered pit below floor level and has an adjustable axle contact member thereon, and it relates specifically to a remotely controlled adjustable axle contact member which may be positioned relative to the axle of a vehicle before the lift emerges from the covered pit.

Prior automobile lifts generally consisted of a single hydraulic post and an H-shaped superstructure. The post operated in a cylinder extending into the floor of the service station or garage and the superstructure rested upon the floor. A vehicle to be lifted was driven upon the superstructure and then both the superstructure and the vehicle were lifted off of the floor by the hydraulic post.

Two-post lifts have been developed in which one post is adapted to contact the front axle of a vehicle, and a second post is adapted to contact the rear axle of the vehicle. Many advantages in automotive servicing and repair work are obtainable by a two-post lift. However, a problem immediately arose with two-post lifts which was not apparent in the one-post lift having a large superstructure upon which the vehicle could be driven, and that problem was to make the lift adaptable to vehicles of widely varying wheel bases. That is, the lift, to be of any practical value, must be able to service substantially any make or model of automobile. Further, the modern lift is designed to raise the vehicle by contacting the axle of the vehicle rather than the wheels. Therefore, the superstructure of the modern lift is substantially more narrow than the old type of superstructure having a wide path upon which the wheel of the vehicle was adapted to rest. Because of the narrow width of the superstructure in the modern lift, and because it is desirable to leave the undercarriage of the vehicle as nearly unobstructed by the lifting superstructure as possible, axle contact members are provided on the superstructure of each post in a two-post lift, and the axle contact members on the rear post are shiftable for contacting the rear axle of a vehicle regardless of its position. Therefore, the vehicle is placed with the front axle thereof over the front post of the lift and the shiftable axle contact members are aligned with the rear axle before the rear post of the lift is raised. Thus, by providing the shiftable contact members on one of the posts of a two-post lift, the two-post lift is readily adaptable for any length wheel base vehicle within a predetermined range.

In order to make the lift more valuable, recent developments have been made to provide pits into which the entire lift including the superstructure could withdraw and be covered. Thus the large amount of floor space normally occupied by an automobile lift is available in the modern garage for other purposes when the lift is not being used. The space thus saved is equivalent to an entire supplemental garage in service stations and service garages having numerous lifts. Prior to the present invention, however, the axle contact members provided with two-post lifts were very difficult to align with the axle of the vehicle. As before stated, the modern two-post lift is retracted into a pit which is covered in order that the floor area may be used for other purposes when the lift is retracted. The axle contact member is thus covered and out of sight within the lift pit. Consequently, prior lift devices require the attendant to start the lift in its upward direction until it extends just above the floor level of the pit. Then the attendant uses a long rod or crawls under the car to move the axle contact members into line with the rear axle of the vehicle.

An object of the invention is to provide an improved axle contact member for a vehicle lift.

Another object of the invention is to provide an axle contact member which may be moved with respect to the lift mechanism to adapt the lift for raising vehicles of various wheel base by their axles.

Still another object of the invention is to provide means for adjustably moving the axle contact members of a vehicle lift while the lift is enclosed within a covered pit.

Yet another object of the invention is to provide remote control adjustment means for adjusting the axle contact members of a vehicle lift covered within a floor pit.

A still further object of the invention is to provide remote control handle means a distance from a vehicle lift which is adapted to be covered within a floor pit, and extension means below floor level extending from the control handle means to the pit, the extension means being adapted to be operated by the control handle to move the concealed axle contact members of the lift relative to a vehicle parked over the lift.

Other objects and a fuller understanding of the invention may be had by referring to the following description and claims, taken in conjunction with the accompanying drawings, in which:

Figure 2 is a diagrammatic illustration explaining the fundamental principles of operation involved in the preferred embodiment of the invention;

Figure 3 is a top view of one portion of an automobile lift having the preferred embodiment of an adjustable axle contact means and position-adjusting means of this invention;

Figure 4 is a side view illustrating principally the position adjusting means as viewed substantially along the line 4—4 of Figure 3;

Figure 1:
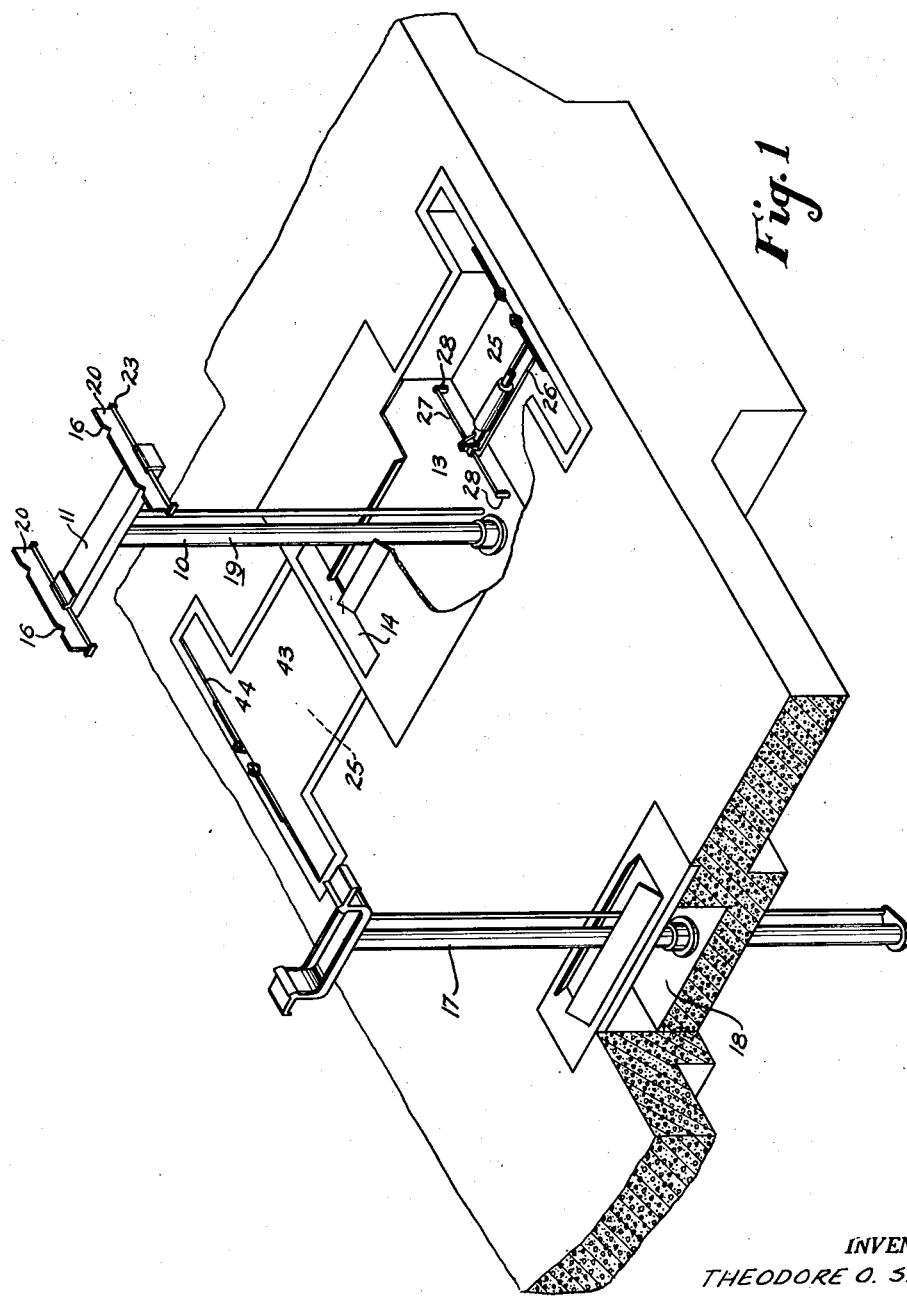
Figure 1 is a perspective view of a two-post lift which is retractable within a covered floor pit, the rear post being provided with the axle contact members and adjusting means of this invention for adjusting the position of the axle contact members within the covered pit.

Figure 5 is an end view of one-half of the lift as viewed substantially along the line 5—5 of Figure 3, with the position-adjusting means engaged with the axle contact means for adjusting the position of the axle contact means; and Figure 6 is a full view similar to Figure 5 showing both the right-hand and left-hand wheel contact means and adjustment means, with the lift raised from the pit in contact with the axle of an automobile, and with the position-adjusting means retracted clear of the lift in its rest position.

The drawings illustrate an embodiment of the first invention providing means to adjust the position of an axle contact device upon a covered lift while the lift and axle contact device are covered within a lift pit. As previously indicated, the modern two-post lift generally is provided with adjustable axle contact means only upon the rear post, although, if desired, four adjustable axle contact devices could be provided. Therefore, without limiting this invention to any particular number of adjustable axle contact devices, the rear post of a two-post lift is illustrated with right and left adjustable axle contact devices.

In the Figure 1 of the drawing the general plan of a two-post lift is illustrated having a front lift 17 of conventional construction adapted to withdraw into a pit 18, and a rear lift 19 adapted to withdraw into a lift pit 13. The principles of this invention, and an actual embodiment of the invention, are illustrated only in connection with the rear lift 19, because substantially all lifts provided for service stations and garages require only that the rear lift 19 has adjustable axle contact means. Both the front pit 18 and the rear pit 13 may be covered by any suitable means when the post and superstructure thereon are withdrawn into the pit.

Figure 2 of the drawing is a diagrammatic illustration of the improved adjustable axle contact means and position-adjusting means of this invention, and the Figure 1 illustrates the relative position of the positioning-adjusting means with respect to the axle contact means. The actual details of construction of the illustrated embodiment of the invention are set forth in the remaining figures of the drawing.

The rear lift 19 comprises a hydraulic post 10 of suitable standard design and construction, having a cross member 11 bolted on the end of the post 10 by bolts 12, or any other suitable means of attachment. A feature of this invention is found in the provision of two longitudinally shiftable axle contact members 20 which are longitudinally and shiftably supported on the end of cross member 11. The axle contact members 20 have bearing rods 21 welded along the bottom edge thereof, and the ends of the cross member 11 are provided with hook clamps 22. The bearing rods 21 are adapted to cooperate with the hook clamps 22 to provide longitudinally shiftable bearing means for the axle contact members 20 whereby the members 20 may be shifted longitudinally with respect to the cross member 11. End bumpers 23, as best illustrated in the Figure 3, prevent the ends of the axle contact members 20 from passing through the hook clamps 22, and thereby prevent the axle contact members 20 from becoming unintentionally disengaged from the cross member 11. The axle contact members are provided with spaced notches 16, as best illustrated in the diagrammatic Figure 2, for engaging the axle of a vehicle and preventing shifting of the axle upon the axle contact members 20. There are two notches 16 provided on each axle contact member 20 in order that a minimum shifting of the members 20 will be required because the closest notch 16 may be moved to engage the axle.

The position-adjusting feature of this invention is explained best in the diagrammatic Figure 2, and the actual details of construction are illustrated in the remaining figures of the drawing. In Figure 1 of the drawing two laterally extending pits 25 are illustrated, one of which is open in the drawing for the purpose of illustration. Each of the axle contact members 20 is provided with an independent position-adjusting means and may therefore be adjusted to any desired position upon the cross member 11. Because the construction and operation of both of the position-adjusting devices are essentially identical, the Figure 3 illustrates only one of the position-adjusting devices. A truck 24 is adapted to shuttle back and forth upon a track 29 within the pit 25. The track 29 extends substantially parallel to the longitudinal path of reciprocable movement of the corresponding axle contact member 20, and is spaced from the axle contact member 20 a convenient distance of a foot or more. The truck 24 is adapted to shuttle smoothly upon the track 29 by the provision of bottom rollers 31 (see Figure 4) to support the weight of the truck, and by end rollers 30 to prevent side movement of the truck 24. In the diagrammatic Figure 2, these rollers are eliminated for simplicity of illustration.

An extension arm 26 extends laterally from the truck 24 into the pit 13 adjacent the axle contact member 20 and is provided with a caster 32 to carry the weight thereof. A crossbar 27 is suitably bearinged on the end of the extension arm 26, and extends substantially parallel to the axle contact member 20 within the lift pit 13. The reference character 50 indicates a suitable bearing carried by the extension arm 26 for rotatably supporting the crossbar 27. The bearing 50 may be a roller bearing or sleeve bearing, depending upon the quality of construction desired, although a sleeve bearing should suffice for this type of installation. Extension fingers 28 are attached at each end of the crossbar 27, as best illustrated in the Figure 2. The crossbar 27 is slightly longer than the length of the axle contact member 20, and therefore the extension fingers 28 may be turned into the path of the longitudinal movement of the axle contact member 20 by rotation of the crossbar 27. Likewise, of course, the fingers 28 may be withdrawn out of the path of longitudinal movement of the axle contact member 20 by rotation of the crossbar 27.

From the description thus far given of the invention, it will readily be seen that the position-adjusting means will operate to shift the axle contact member 20 with respect to the cross member 11 of the lift post 10. Furthermore, this means will operate to shift the axle contact members 20 to a selected position although the axle contact members 20 are covered within the pit 13 and are out of sight to the operator. This shifting operation is done from the remote position of the truck 24. Means is provided on the truck 24 to control the rotation of the crossbar 27 and thereby control the extension or retraction of the extension fingers 28 into and out of the path of movement of the axle contact members 20. Then by engaging the extension fingers 28 on each end of the axle contact member 20 substantially as illustrated in the Figure 2, the operator may longitudinally shift the truck 24 upon the track 29 and thereby move the extension arm 26 and the crossbar 27 longitudinally and move the axle contact member 20 to any desired position with respect to the cross member 11 on the post 10.

Specifically, the control of the crossbar 27 and the fingers 28 is accomplished by means of a lever linkage system indicated generally by the reference character 33, and operating handles 34. The handles 34 are pivotally attached to the truck 24 by means of pivot pins 35. A spring-loaded flexible cable 36 is attached to the end of one of the handles 34 and extends around a first pulley 37 and a second pulley 38 to a spring-urged link 39. The second handle 34 is mechanically linked to the first handle 34 by means of a rod 40 as best illustrated in the Figure 2, and therefore the two handles will operate together to pull the cable 36 against the urge of the spring link 39. That is, the handles 34 are adapted to extend horizontally as illustrated in the Figures 3 and 4, but may be rotated about the pivot pins 35 to pull the cable 36 against the urge of the spring link 39. The spring link 39 is in turn interconnected to the crossbar 27 by means of a link 41 and a lever arm 42. The lever arm 42 is securely attached to the crossbar 27, and the link 41 is pivotally connected between the end of the lever arm 42 and the spring link 39. In Figure 2 the link 41 is illustrated as being an H-shaped yoke member adapted to receive a tongue end 47 of the spring link 39. The weight of fingers 28 will tend to rotate the crossbar 27 and raise the lever arm 42, and therefore, when the end 47 of link 39 moves toward the crossbar 27, the link 41 will jackknife to the position illustrated in Figure 6. When the link 39 is retracted away from crossbar 27, the link 41 and arm 42 will be pulled to a position substantially as illustrated in Figures 2 and 5. Therefore, the handles 34 may be pivoted on the pins 35 to pull on the cable 36. When the cable 36 is pulled against the urge of the spring link 39, the link 41 will be pulled into the position illustrated in the Figure 5, and will rotate the crossbar 27 and extend the fingers 28 into the position illustrated in Figure 2 across the path of longitudinal movement of the axle contact member 20. Thereafter, the operator can move the truck 24 by pushing upon the handles 34, and will move the axle contact member 20 to any desired position.

As previously stated, it is desired to move the axle contact member 20 while that member 20 remains covered within a closed pit. In the Figures 1 and 3, the pit 13 is illustrated as being covered by doors or cover plates 14, but any suitable or conventional method of covering the pit may be employed. The pits 25 are also covered by any suitable means, such as the cover plate 43, except for a longitudinal slot 44. The slot 44 is wide enough to allow the handles 34 to pass therethrough, but otherwise substantially close the entire pit 25. The handles 34 are provided with rings 45 on the ends thereof substantially as illustrated in the Figure 3 of the drawing. The rings 45 are greater in diameter than the width of the slot 44, and therefore will remain upon the surface of the floor above the plate 43. Otherwise, the entire lift with its superstructure including the axle contact members 20, and the entire position-adjusting means is below the surface of the floor and permits the entire floor surface to be used when the lift is out of service. Therefore, in order to indicate to the operator the position of the notches 16 on the axle contact members 20, the pivot pins 35 of the handles 34 are placed upon the truck 24 to correspond to the exact position of the notches 16 on the axle contact member 20. When the operator grasps the rings 45 and rotates the handles 34 to their upright position as illustrated in the Figure 2, the handles 34 will indicate to the operator the exact position of the notches 16. The operator may longitudinally shift the truck 24 and carry the axle contact member 20 therealong until one of the handles is substantially aligned with the axle of the vehicle to be lifted. The operator then knows that one of the corresponding notches 16 will be correctly aligned with the axle of the vehicle when the lift is extended out of the covered pit 13. Therefore, the operator need not stop the lift in its upward motion to adjust the position of the axle contact member 20, and will thus save the time and bother of looking under the car to adjust the position of the axle contact member.

In Figure 6 of the drawing, a cross-sectional view through the pit 13 and the lateral pit 25 illustrates the handles 34 returned to their lateral position within the pit 25, and illustrates the return of the fingers 28 to their downward position by the spring-return action of the lever linkage system 33. It will be seen that the fingers 28 are removed from the position of engagement with the axle contact members 20, and the hydraulic post 10 may raise the axle contact members 20 into engagement with an axle 46 of a vehicle without interference.

After the superstructure has been lowered down into the pit 13, the members 20 and the fingers 28 may have become misaligned with respect to one another. In such event, when the handles 34 are attempted to be lifted by the operator, one of the fingers 28 will strike the longitudinal side of the member 20 instead of passing past the end thereof. If the member 20 and the fingers 28 do become thus misaligned, the operator can shift the truck 24 a slight distance and re-align 28 with respect to the ends of the member 20.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a vehicle lift, longitudinally shiftable vehicle axle contact means, power means drivingly connected to said axle contact means for imparting lifting movement thereto, signal means positioned laterally of said lift and movable in a lateral path with respect to said axle contact means, said signal means thereby being laterally alignable with the axle of a vehicle parked over said lift, and power transmission means operably interconnecting both said axle contact means and said signal means together in lateral alignment for shifting said aligned axle contact means and signal means together longitudinally of the sand lift, whereby said signal means may be moved laterally by said power transmission means with respect to said vehicle lift to align the signal means with the axle of a vehicle parked thereabove, and the axle contact means will thereby be moved into perfect alignment with the axle of the vehicle without direct observation.

2. In a vehicle lift which is retractable within a lift pit below a floor level, the provision of longitudinally shiftable axle contact means mounted on said lift, signal means positioned laterally of said lift and movable in a lateral path with respect to said axle contact means, said signal means thereby being laterally alignable visually with the axle of the vehicle parked over said lift, and power transmission means extending below said floor level in operable interconnection with both said axle contact means and said signal means, said axle contact means being driven by said power transmission means to a predetermined position corresponding to a predetermined position of the signal means, whereby the axle contact means may be moved to an alignment position with respect to the axle of a vehicle parked over said lift by moving said signal means to a lateral alignment position with said axle of the vehicle.

3. In a vehicle lift which is retractable within a lift pit below a floor level, the provision of longitudinally adjustable axle contact means mounted on said lift, a covered truck pit below floor level extending laterally of said lift pit, a truck adapted to be operated in said truck pit in a direction substantially parallel to said longitudinal movement of the axle contact member, extension means carried by said truck extending below floor level from said truck into said lift pit, said extension means having a crossbar carried within said lift pit for movement with said truck in a direction substantially parallel to said longitudinal direction of movement of the axle contact member, said crossbar being mounted on said extension means for longitudinal rotation of the crossbar, finger means mounted on each end of the crossbar, said finger means being swingable by rotation of the crossbar to a first position extending across the path of longitudinal movement of the axle contact means, and being swingable to a second position retracted out of said path, and control means carried by said truck for operating said fingers and for operating the truck, said axle contact member thereby being positionable within the closed lift pit with respect to the axle of a vehicle parked over the lift.

4. In a vehicle lift which is retractable within a lift pit below a floor level, the provision of longitudinally adjustable axle contact means mounted on said lift, a covered truck pit below floor level extending laterally of said lift pit, a truck adapted to be operated in said truck pit in a direction substantially parallel to said longitudinal movement of the axle contact member, extension means carried by said truck extending below floor level from said truck into said lift pit, said extension means having a crossbar carried within said lift pit for movement with said truck in a direction substantially parallel to said longitudinal direction of movement of the axle contact member, said crossbar being mounted on said extension means for longitudinal rotation of the crossbar, finger means mounted on each end of the crossbar, said finger means being swingable by rotation of the crossbar to a first position extending across the path of longitudinal movement of the axle contact means, and being swingable to a second position retracted out of said path, and control means carried by said truck for operating said fingers and for operating the truck, said control means including signal means visual above the floor level and in lateral alignment with said finger means, said axle contact member thereby being positionable with the closed lift pit with respect to the axle of a vehicle parked over the lift.

5. In a vehicle lift, longitudinally shiftable vehicle axle contact means, power means drivingly connected to said axle contact means for imparting lifting movement thereto, signal means outside of the area of said vehicle lift, said signal means being constructed to indicate the position of a vehicle axle with respect to said lift, and means operably interconnecting said axle contact means and said signal means for moving each a corresponding amount with respect to the other, whereby the signal means may be moved to indicate the position of a vehicle axle parked over said lift and the axle contact means will be accurately shifted to a position directly under the axle.

THEODORE O. SNIDER.

REFERENCES CITED

The following references are of record in the file of this patent:

UNITED STATES PATENTS

| Number | Name | Date |
|---|---|---|
| 1,849,777 | Weaver | Mar. 15, 1932 |
| 1,889,185 | Stukenborg | Nov. 29, 1932 |
| 2,015,357 | Weaver | Sept. 24, 1935 |
| 2,091,067 | Engh | Aug. 24, 1937 |
| 2,120,051 | Tully | June 7, 1938 |
| 2,423,954 | Thompson | July 15, 1947 |